US005572488A

United States Patent [19]

Yamada et al.

[11] Patent Number: 5,572,488

[45] Date of Patent: Nov. 5, 1996

[54] WRISTWATCH PAGING RECEIVER HAVING ANALOG MESSAGE DISPLAY

[75] Inventors: Takehide Yamada, Beaverton; Dimitri Dimitriadis, Lake Oswego; Garold B. Gaskill, Tualatin, all of Oreg.

[73] Assignee: Seiko Communications Holding N.V., Netherlands Antilles

[21] Appl. No.: 169,480

[22] Filed: Dec. 17, 1993

[51] Int. Cl.[6] .......................... G04B 47/00; G04B 19/04; H04B 7/00

[52] U.S. Cl. .......................... 368/10; 368/47; 340/825.44

[58] Field of Search .......................... 368/1, 9, 10, 11, 368/47, 76, 80; 340/825.44, 825.45, 825.46, 825.49

[56] References Cited

U.S. PATENT DOCUMENTS

| | | | |
|---|---|---|---|
| 2,824,218 | 2/1959 | Gilliland | 368/47 |
| 4,650,344 | 3/1987 | Allgaier et al. | 368/47 |
| 4,663,624 | 5/1987 | Bui et al. | 340/825.44 |
| 4,786,902 | 11/1988 | Davis et al. | 340/825.44 |
| 4,845,485 | 7/1989 | Pace | 340/825.44 |
| 4,872,005 | 10/1989 | DeLuca et al. | 340/825.44 |
| 5,140,561 | 8/1992 | Miyashita et al. | 368/10 |
| 5,297,118 | 3/1994 | Sakumoto | 368/10 |
| 5,329,501 | 7/1994 | Meister et al. | 368/10 |

*Primary Examiner*—Vit W. Miska
*Attorney, Agent, or Firm*—Elmer Galbi

[57] ABSTRACT

A paging receiver as part of a wristwatch. Received messages are displayed using an analog mechanism. A plurality of disks largely hidden behind a watch face, but having a small area visible through an aperture in the watch face, can be independently rotated to display standard messages, coded messages, and number sequences. Other analog watch mechanisms such as drums and sliding bars visible through respective apertures in the watch face can include marks representing standard paging messages. These other analog watch mechanisms can be moved such that a selected mark is visible through the respective aperture in response to receiving a paging message. A special hand on the watch may be controlled to point to markings on the watch's face or bezel which signify standard paging messages received by the pager.

5 Claims, 8 Drawing Sheets

WRISTWATCH PAGING RECEIVER HAVING ANALOG MESSAGE DISPLAY

FIELD OF THE INVENTION

The present invention relates to the field of paging receivers. More specifically, the invention relates to a paging receiver that displays received messages using an analog mechanism.

BACKGROUND OF THE INVENTION

A paging receiver, or "pager," is typically contained in a small box that is clipped to its user's belt or waistband. When the pager receives a paging message or "page" it provides an audible signal or vibrates to alert the user to the new message. The user can then look at the message displayed on a digital display.

Pagers small enough to fit within a wristwatch case are also presently available. See Gaskill et al., U.S. Pat. No. 4,713,808 for an example of a paging receiver contained within a watch. See also Pace, U.S. Pat. No. 4,845,485.

Typically, these "watch pagers" have digital liquid crystal displays to display the current time and any received paging messages. However, some of the pagers shown in the prior art include an analog watch and a liquid crystal display for paging messages.

The present invention provides an improved mechanism for displaying paging messages.

SUMMARY OF THE INVENTION

According to the present invention, a received paging message is displayed using an analog mechanism. In one preferred embodiment of the present invention, a received message is displayed using an analog disk mechanism. Located on the disk are marks representing standard paging messages. When a paging message is received, the disk is rotated such that the corresponding mark is in a predetermined location. The disk is located behind or in the face of an analog watch. The mark is visible through an aperture in the watch face.

In another embodiment of the present invention, multiple independently-rotatable disks having numbers thereon may be used to display a received paging message including a number sequence.

Selected letters may be included on the disks, allowing the disks to be rotated to positions to display non-numeric paging messages.

In another embodiment of the present invention, a received message is displayed using an analog watch mechanism having a drum or sliding bar. Located on the drum or sliding bar are marks representing standard paging messages. When a paging message is received, the drum or mark is moved such that the corresponding mark is in a predetermined location.

The drum or sliding bar is located behind the face of an analog watch. The marks are visible through an aperture in the watch face.

In one embodiment of the invention the watch hands are used to display the time at which the message was received.

In another embodiment of the invention a special hand that is independently controllable is used to display messages. Around the perimeter of the special hand's range of rotation are marks representing standard paging messages, such as "Call Home," or "Call Office." When a paging message is received, the special hand is moved to point to the corresponding mark.

The foregoing and additional objects, features and advantages of the present invention will be more readily apparent from the following detailed description of preferred embodiments thereof which proceed with reference to the accompanying drawings.

DETAILED DESCRIPTION OF THE INVENTION

Figure 1:
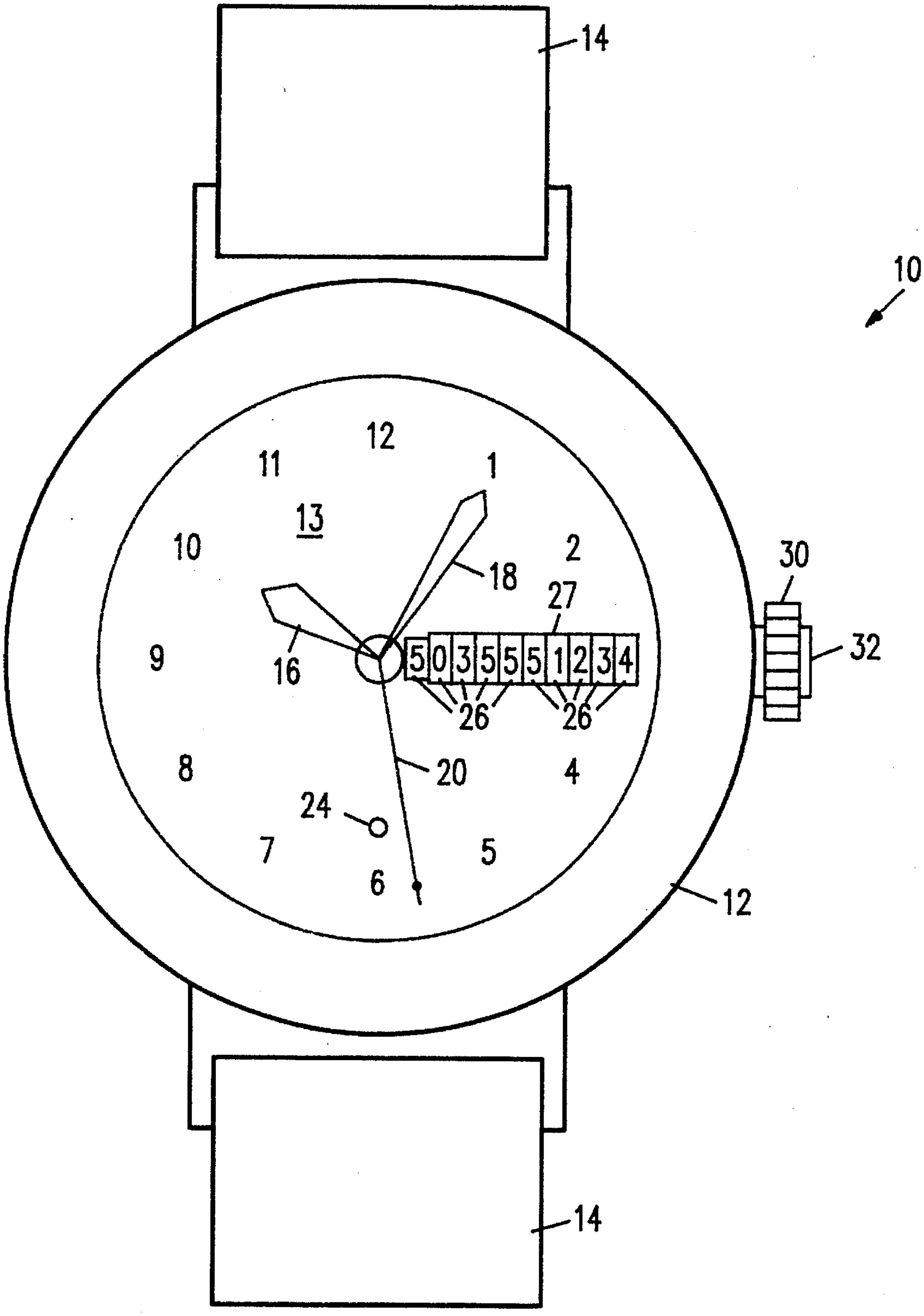
FIG. 1 shows a plan view of an exemplary wristwatch paging receiver having analog message display according to the present invention which has a plurality of disks revealed through an aperture

A first preferred embodiment of the present invention shown in FIG. 1 includes a wristwatch paging receiver ("pager") 10 having an analog message display. The paging receiver shown in FIG. 1 includes an analog wristwatch body 12 which has an analog watch face 13. As is typical for a wristwatch, the pager 10 has straps 14 for securing the wristwatch body 12 to a user's wrist. The pager 10 has an hour hand 16, a minute hand 18, and a second hand 20. The pager rotates these three hands in a conventional manner to display the current time.

The pager 10 also includes a "message received" indicator consisting of light-emitting diode ("LED") 24 to indicate to the user that a paging message is waiting to be displayed.

A rotating, knurled stem 30 enables the user to set the current time for the pager 10 to display. A push button 32, which may be integral with the stem 30, enables the user to control what information the pager displays.

The pager 10 includes a plurality of disks 26. Most of the surface area of the disks is hidden behind the watch face 13, but a small portion of each disk is revealed through an aperture 27 in the watch face.

Marked around the perimeters of the disks 26 are the numbers "0" through "9" as well as selected letters, as discussed below. The pager 10 can rotate each disk independently of the other disks to reveal a selected number or letter through the aperture 27. Thus, the plurality of disks 26 can display a number sequence. Using ten disks as shown in FIG. 1, a phone number including an area code may be displayed. For example, the disks in FIG. 1 display the telephone number "(503) 555-1234."

The numbers "0" through "9" do not use all of the available perimeter space on the disks 26. Thus, selected letters, icons and blank spaces are also included on the disks such that standard paging messages such as "HOME," "OFFICE," "EMAIL," "VMAIL," and "CODE" can be displayed using the disks. A "CODE" message merely is a number. A user can prearrange with others what significance the different code numbers will have. For example, "Code 3" could mean "call spouse at work," and "Code 4" could mean "call child at school." Coded messages are displayed by showing "CODE" using the disks 26 on the left side of the aperture 27 plus the number of the code using another disk on the right side of the aperture.

Alternatively, "icons" or graphical symbols representing the standard paging messages may be marked on one or more of the disks 26. When a standard message is received by the pager 10, the disks are rotated such that the appropriate icon is visible through the aperture 27.

When the disks 26 are not displaying paging message information, they can be controlled to display information such as the month and day, or the time in another time zone, in numeric form. In the preferred embodiment, when there are no paging messages to display, the pager 10 may rotate the disks such that no marks are visible through the aperture 27.

Figure 2:
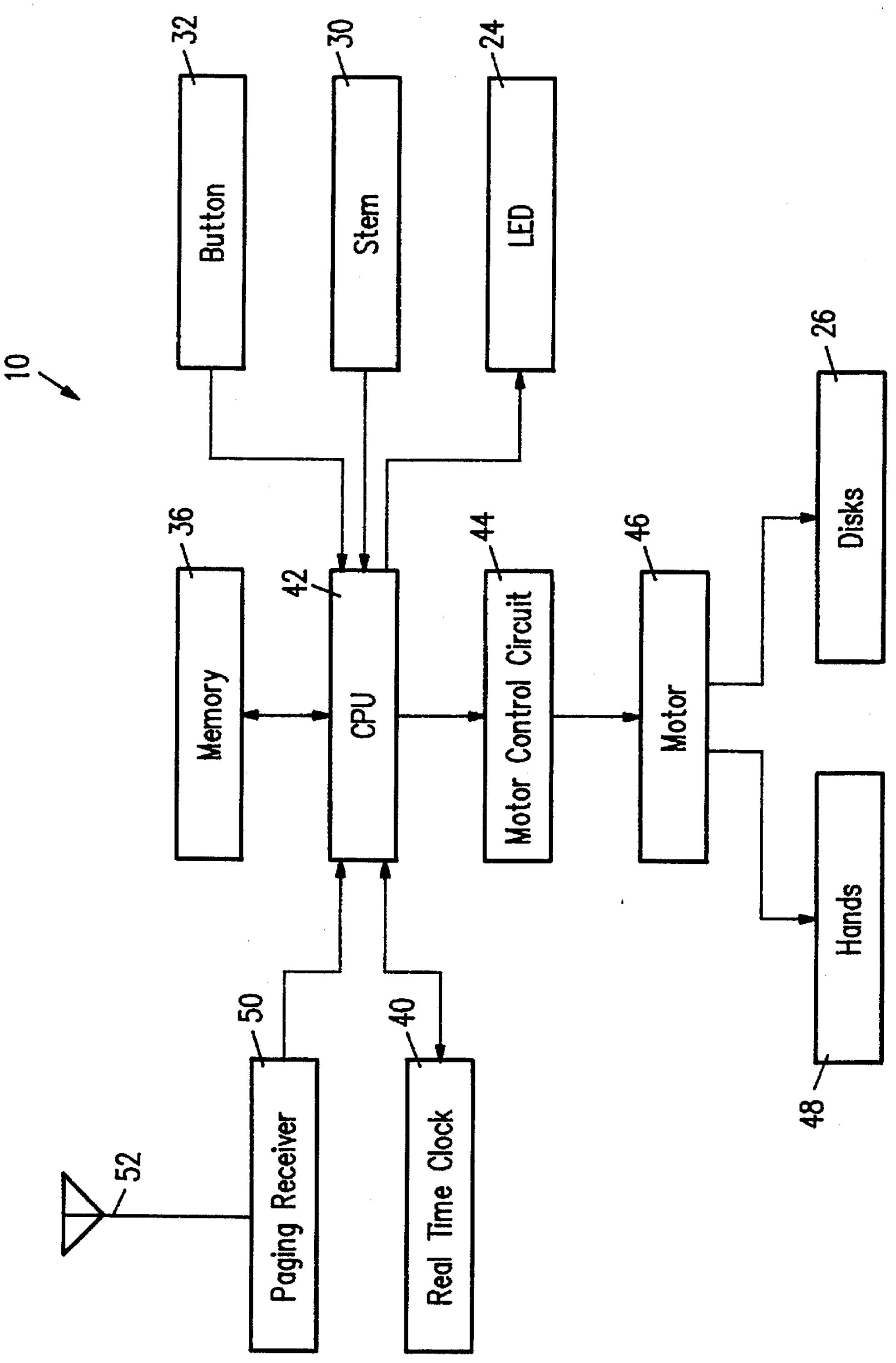
FIG. 2 shows a block diagram of the analog wristwatch paging receiver of FIG. 1.

Referring now to FIG. 2, a pager 10 according to the present invention includes a real-time clock 40, a stem 30, a central processing unit (CPU) 42 with associated program and temporary memory 36, a motor control circuit 44, a stepper motor 46, hands 48, and disks 26. The stepper motor can move and position the disks independently of each other; there is no required mechanical coordination between the disks. The drive shaft from motor 46 can either be mechanically shifted so as to independently drive each of the disks or there can be a stepper motor for each disk.

In normal operation, the CPU 42 reads the current time from the real-time clock 40 and commands the motor control circuit 44 to move the hands 48 to display the current time. The user can set the displayed time by rotating the stem 30. The CPU 42 detects this rotation of the stem 30 and translates that rotation to a corresponding change in the time to be displayed by the hands 48 and maintained by the real-time clock 40.

A paging receiver 50 receives paging messages from a paging transmitting service (not shown) using an antenna 52 and supplies the CPU 42 with the content of the messages. In response, the CPU stores the message in memory 36 and commands the motor 46, via the motor control circuit 44, to rotate the disks 26 to display the content of the message. Preferably, the pager 10 beeps or vibrates to alert the user to the new message.

When the user has seen the message displayed on the disks 26, the user may delete the message by pressing the button 32 for a predetermined time period. Upon deletion of the message, the pager 10 moves the disks to their standard positions when there is no message to display.

If the paging receiver 50 receives a paging message before the user has deleted the previously-received message, the pager 10 stores the newly-received message in memory 36, moves the disks 26 to display the newly-received message, and activates the message received indicator LED 24. Upon deletion of the message being displayed, the pager displays the previously-received message and deactivates the LED 24.

It will be recognized that more than two messages may be stored in the memory 36. In such a case, the pager 10 deactivates the LED 24 only when only one message remains in the memory; this message is displayed by the disks 26. When the final message is deleted, the LED 24 remains deactivated. In this manner, the message received LED 24 signifies that a paging message has been received that is not currently being displayed on the disks 26.

Figure 3:
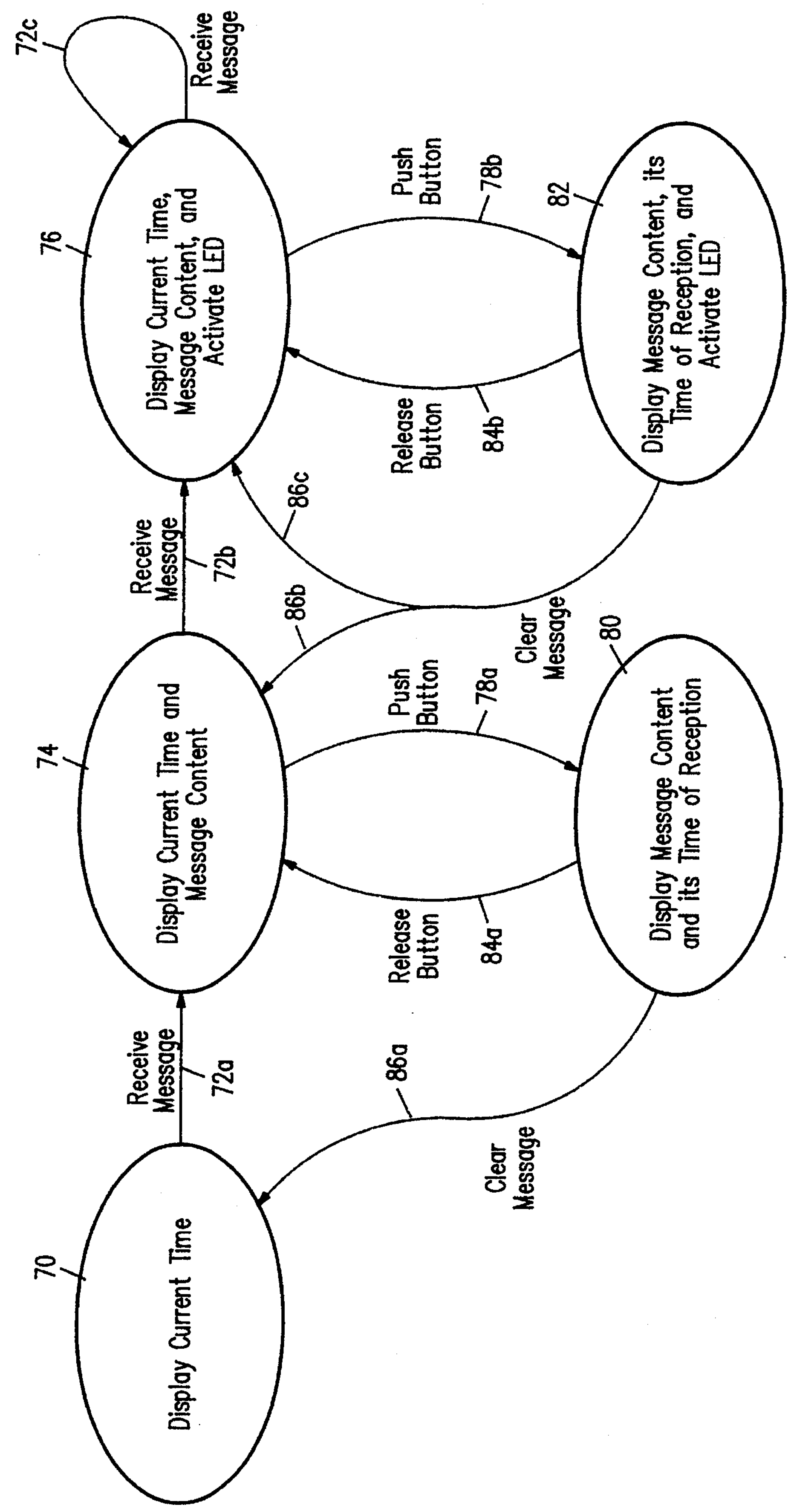
FIG. 3 shows a state diagram of an exemplary behavior of the analog wristwatch paging receiver of FIGS. 1 and 2.

The process of receiving, storing, displaying, and deleting paging messages is shown in the state diagram of FIG. 3. Referring now to FIG. 3, the pager 10 starts in the "Display Current Time" state 70. In this state, the pager has no messages in memory 36 and the hands 48 display the current time. When the paging receiver 50 receives a message, the CPU 42 executes the "Receive Message" transition *72a–72c*.

Figure 4:
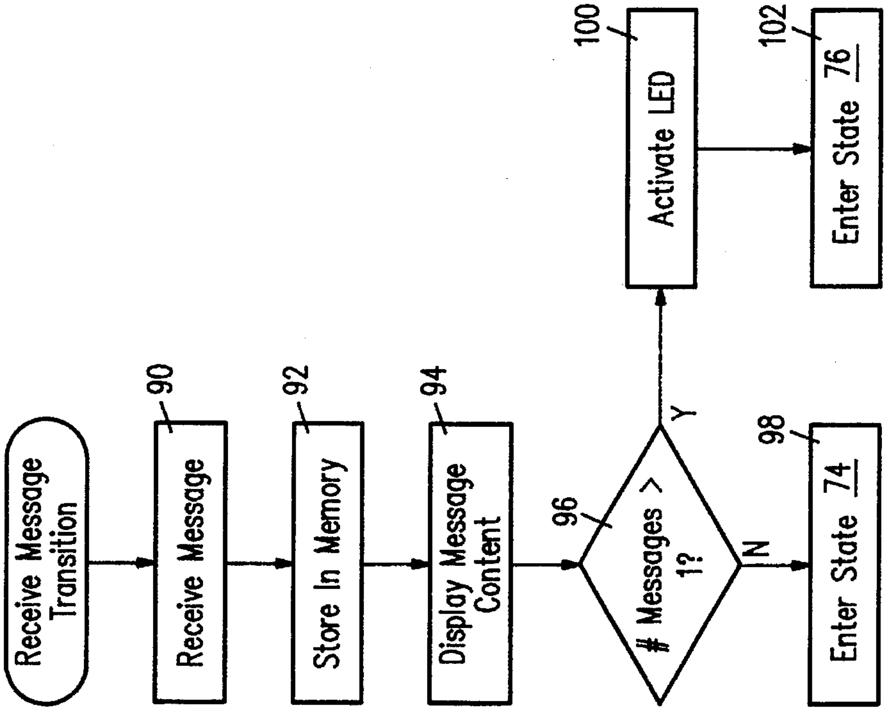
FIG. 4 shows a flow diagram of the "Receive Message" transition of FIG. 3.

Referring now to FIG. 4, which shows a flow diagram of the "Receive Message" transition *72a–72c*, the paging receiver 50 receives a paging message and supplies it to the CPU 42 as step 90. The CPU 42 stores in memory 36 the content of the message and the time it was received and moves the disks 26 to display the content of the message, as steps 92 and 94. If the now-displayed message is the only paging message stored in memory 36, as determined by step 96, the "Display Current Time and Message Content" state 74 (FIG. 3) is entered as step 98. This transition is shown as line *72a* on FIG. 3. Additionally, as part of the "Receive Message" transition, the pager 10 may beep or vibrate to alert the user to the new message.

In the "Display Current Time and Message Content" state 74, the watch hands 16, 18, 20 display the current time, and the disks 26 display the content of the most-recently received message.

Figure 8:
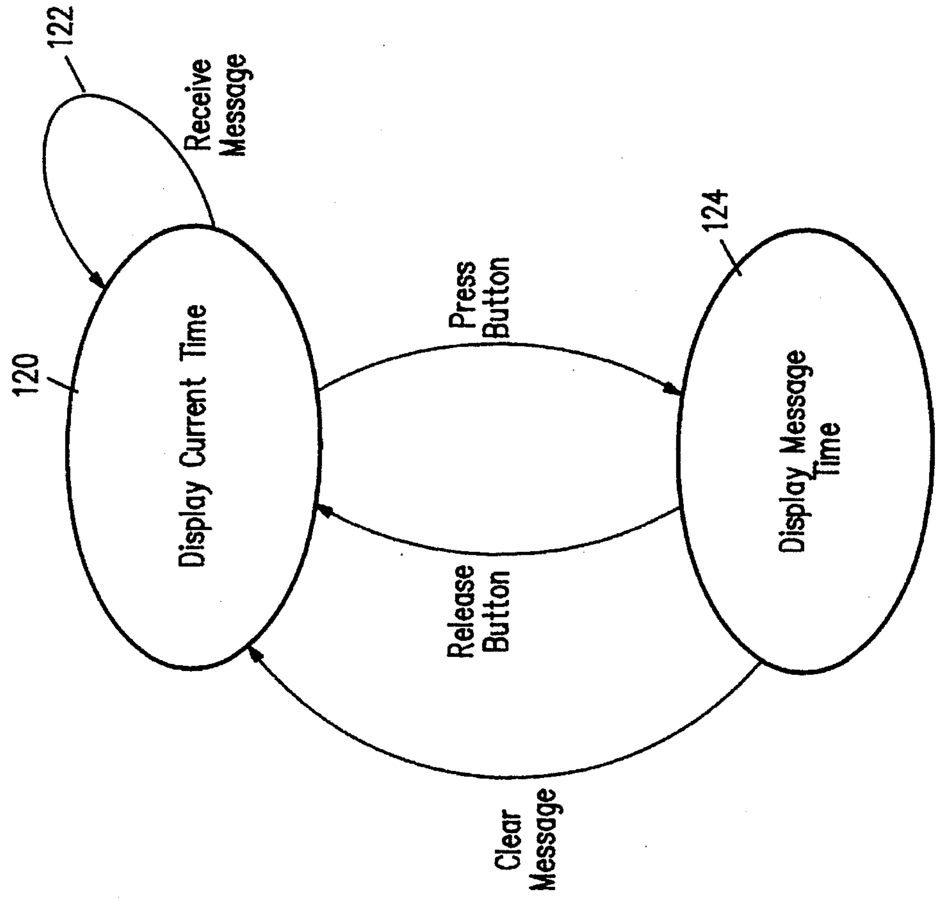
FIG. 8 shows a state diagram of an exemplary behavior of the wristwatch paging receivers of FIGS. 6 and 7.

Refer again to the state diagram of FIG. 8. When the pager 10 is in the "Display Current Time and Message Content" state 74, in response to the user pressing the button 32 (FIG. 1), the pager enters the "Display Message Content and Time of Reception" state 80, as shown by line 78a. In this state, the disks 26 continue to display the content of the received message. Additionally, the pager moves the watch hands 16, 18, 20 to display the time at which the pager received the message. When the user releases the button 32, the pager returns to the "Display Current Time and Message Content" state 74, as shown by line *84a*.

The pager 10 can receive a second paging message when it already has stored a message in memory 36. Since only one message can be displayed at a time, the LED indicator 24 on the watch face 13 is used to indicate that the pager 10 has at least one more message to display. Referring again to FIG. 3, if the pager receives a second message while one message has already been received, it exits "Display Current Time and Message Content" state 74 and enters the "Display Current Time, Message Content, and LED" state 76 through the "Receive Message" transition *72b*.

In the "Receive Message" transition *72b*, the pager 10 receives, stores, displays the message as described above.

However, in step 96 (FIG. 4), the pager determines that more than one message is now stored in memory 36 and activates the LED indicator 24 as step 100 and enters the "Display Current Time, Message Content, and LED" state 76, as step 102.

The "Display Current Time, Message Content, and LED" state 76 is similar to the "Display Current Time and Message Content" state 74, differing only in that the LED indicator 24 is activated. While in this state, the user can display the content and time of reception of the most recently received message by pushing the button 32, as shown by line 78*b*. As a result, the pager enters the "Display Message Content, Time of Reception, and LED" state 82.

In the "Display Message Content, Time of Reception, and LED" state 82, the pager 10 displays the content of the message with the disks 26, as described above. The watch hands 16, 18, 20 display the time at which the pager received the message. The LED indicator 24 is activated to indicate that at least one more message is stored in memory 36. When the user releases the button 32, the pager 10 returns to the "Display Current Time, Message Content, and LED" state 76.

If the pager 10 receives a message while it is in the "Display Current Time, Message Content, and LED" state 76, the message is received and stored, its content is displayed by the disks 26, and the same state 76 is re-entered. This is shown in FIG. 3 as transition 72*c*.

Figure 5:
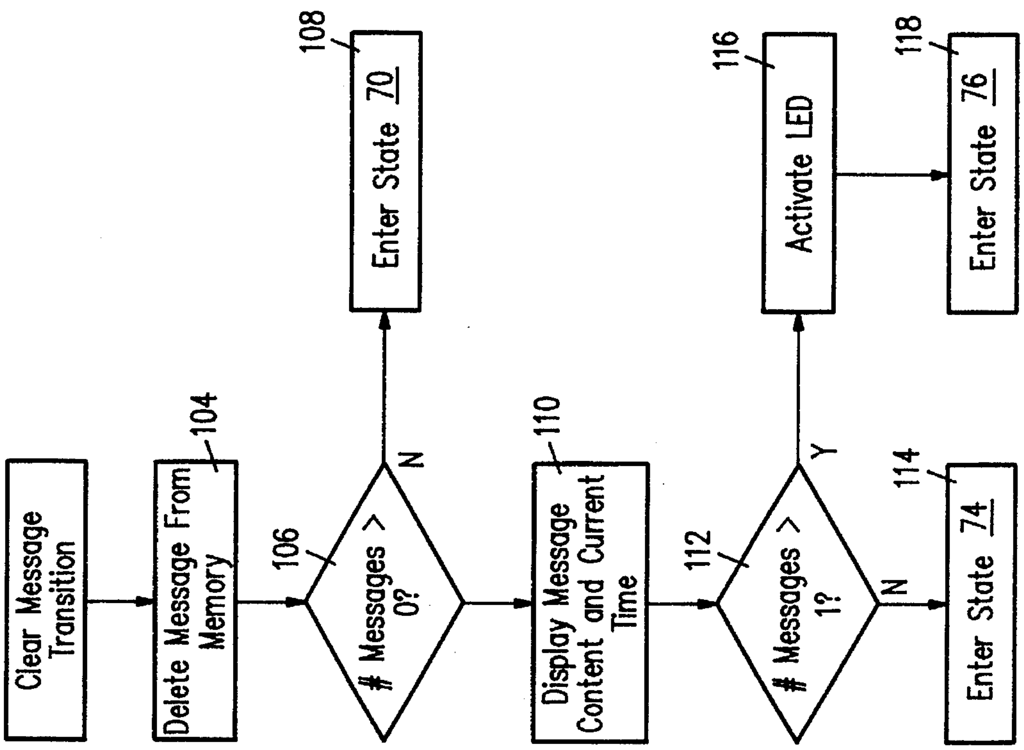
FIG. 5 shows a flow diagram of the "Clear Message" transition of FIG. 3.

The user may delete received messages from memory 36. In fact, to view messages other than the most-recently received message, the user must delete messages. Referring now to FIG. 5, the user presses the button 32 for a predetermined extended time period, such as ten seconds. While the button is held down, the pager 10 displays the content and reception time of the message, as described above for states 80 and 82. When the predetermined time period approached, the pager preferably beeps to indicate that a message is about to be deleted. After the predetermined time period is reached, the message is deleted, as step 104. If no messages remain in memory 36, as determined by step 106, the pager 10 enters the "Display Current Time" state 70 as shown by line 86*a* of FIG. 3.

If another message remains in memory 36, the pager 10 displays it content using the disks 26 and displays the current time using the watch hands 16, 18, and 20, as step 110. If only one message remains in memory 36, as determined by step 112, the pager enters the "Display Current Time and Message Content" state 74 as shown by line 86*b* of FIG. 3. Otherwise, the pager activates the LED 24 and enters the "Display Current Time, Message Content, and LED" state 76 as shown by line 86*c* of FIG. 3.

In the above description, the LED indicator 24 is described as informing the user whether more than one message is stored in memory 36. An additional analog mechanism, such as a disk, drum, or hand, may be used to indicate the number of messages stored in memory 36. This mechanism is controlled to increase by one the number it displayed for each new message received. Likewise, the mechanism is controlled to decrease by one the number it displayed for each message deleted.

Other analog message displays may be used to display received paging messages. In the embodiment shown in FIG. 6, a pager 34 according to the present invention includes an analog wristwatch body 12 and watch face 13. As described above with reference to FIG. 1, the pager 34 has an hour hand 16, a minute hand 18, and a second hand 20. The pager also has a special hand 180 dedicated to displaying the content of received paging messages.

Marks representing certain standard paging messages 22*a*–22*f* are positioned around the perimeter of the watch face 13 or on the watch bezel. As shown in FIG. 4, these standard messages may be "Call Home" 22*a*, "Call Office" 22*b*, "Number" 22*c*, "Code" 22*d*, "Email" 22*e*, and "Voice Mail" 22*f*. Although the standard messages are shown spelled out in the exemplary pager 34 of FIG. 4, icons representing the standard messages may be used.

The "Number" mark signifies that the pager 34 received a number sequence, such as a telephone number for the user to call. Methods of displaying a number sequence are discussed below.

The pager 34 also includes a rotatable disk 181 behind the watch face 13. A small portion of the disk 181 is revealed through an aperture 182 in the watch face. The disk is used to display the number of paging messages stored in the memory 36.

When there is no message to be displayed, the special hand 180 points to an arbitrary location where there is no message mark, such as at the hour "12" numeral at the top of the watch face 13.

Figure 7:
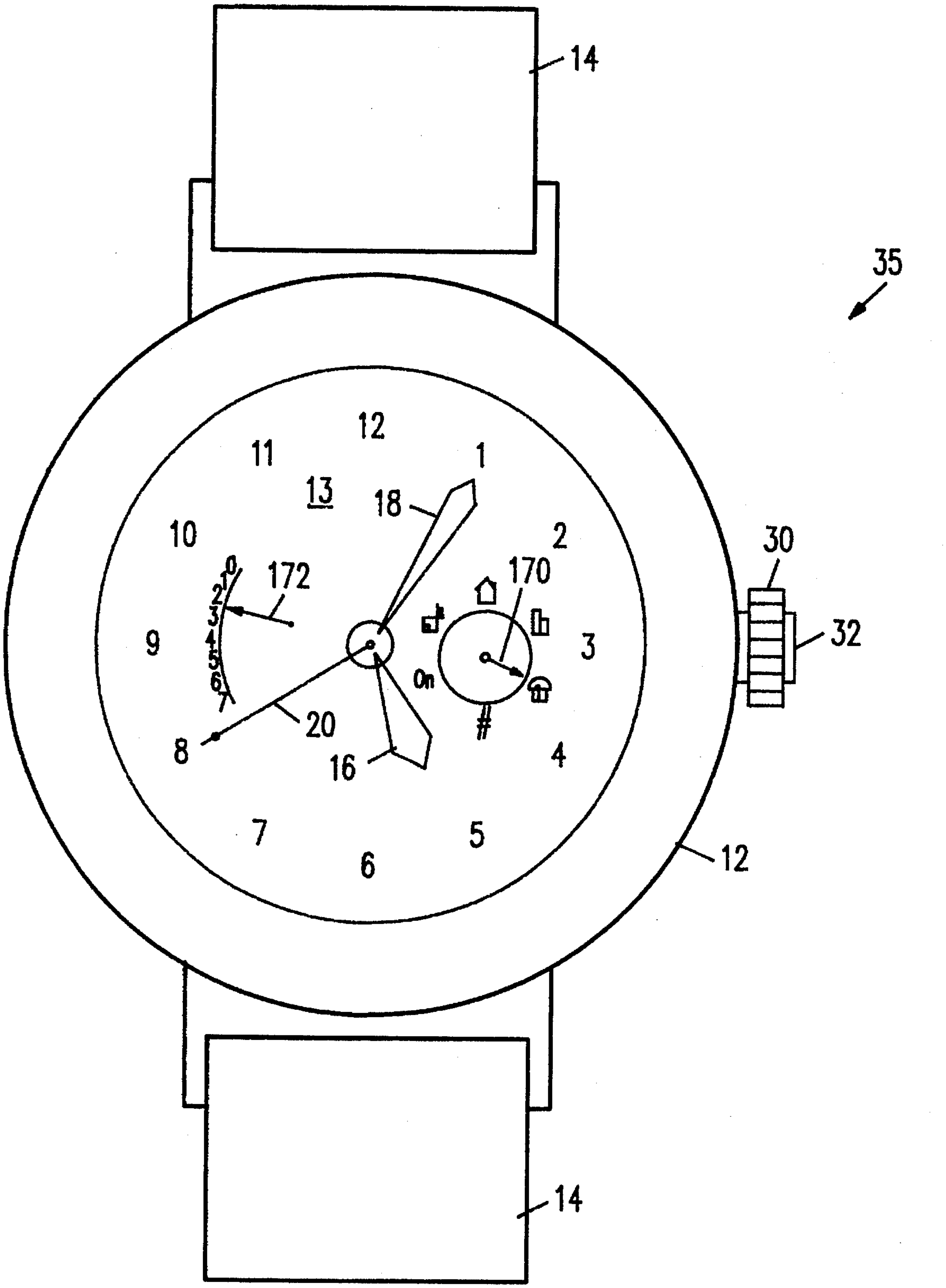
FIG. 7 shows a plan view of another exemplary wristwatch paging receiver having pointers that move through respective arcs.

A dedicated, special hand used to display the content of received paging messages need not have the same rotational axis as the standard watch hands. Referring now to FIG. 7, another pager 35 according to the present invention has a first rotatable special hand or pointer 170 that is surrounded by exemplary icons representing the standard paging messages discussed above. For example, "Call Home" is represented by a picture of a house, "Call Office" is represented by a picture of a city skyline, "Voicemail" by a picture of a telephone, "Number" by a "#" symbol, "Code" by a picture of a key, and "Email" by a picture of a computer terminal. The pager 35 displays the content of a received message by rotating the pointer 170 to the appropriate icon.

A second pointer 172 is used to display the number of paging messages held in memory 36. As shown by this second pointer, pointers need not rotate through a full circle.

Figure 6:
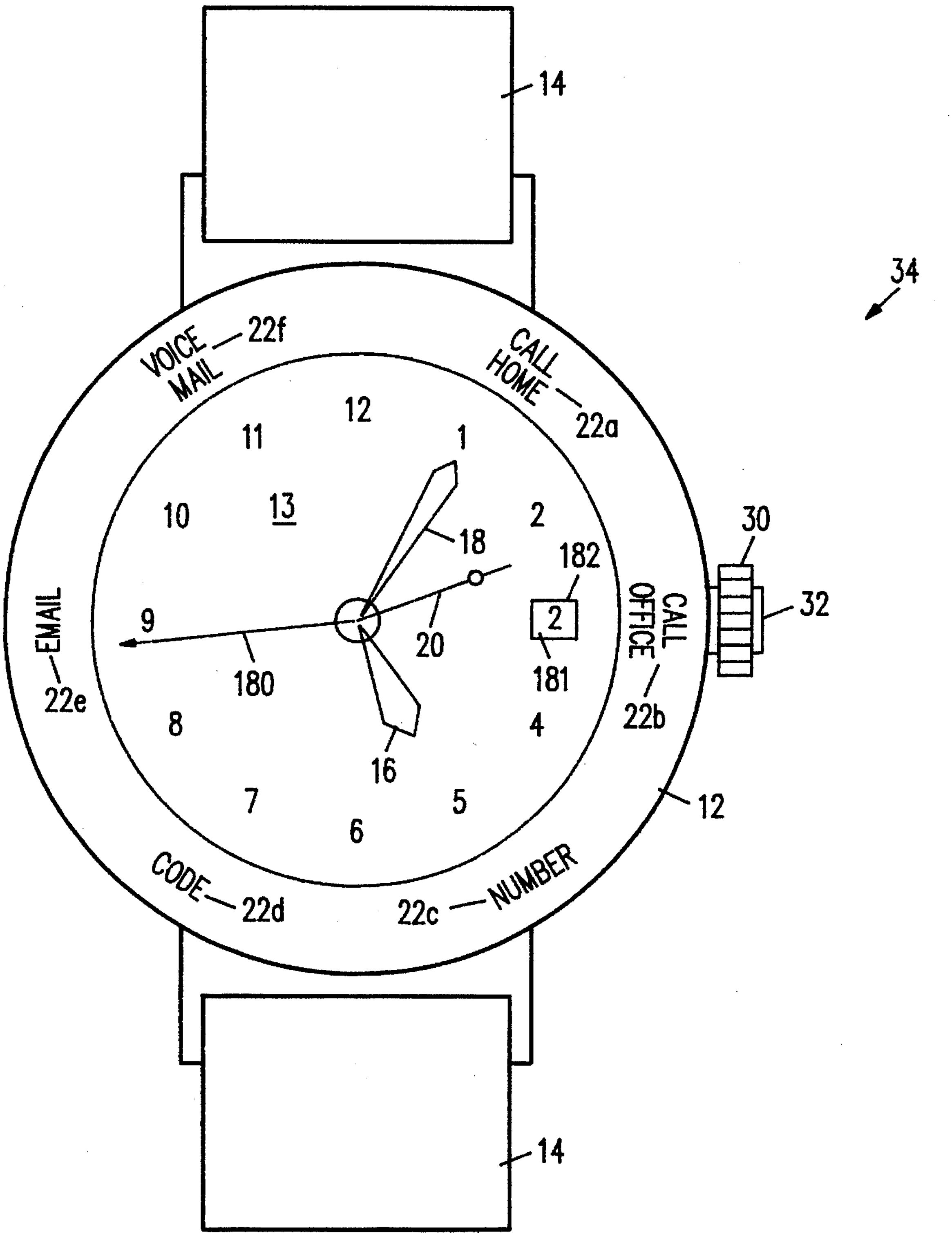
FIG. 6 shows a plan view of another exemplary wristwatch paging receiver according to the present invention which displays received paging message using a special, dedicated hand.

The pagers 34, 35 of FIGS. 6 and 7 can operate virtually identically, having basically the same capabilities. Referring now to FIG. 8, an exemplary behavior of a pager according to the present invention is shown. In the "Display Current Time" state 120, the watch hands 16, 18, 20 display the current time. When the pager 34, 35 receives a message, the pager executes the "Receive Message" transition 122.

Figure 9:
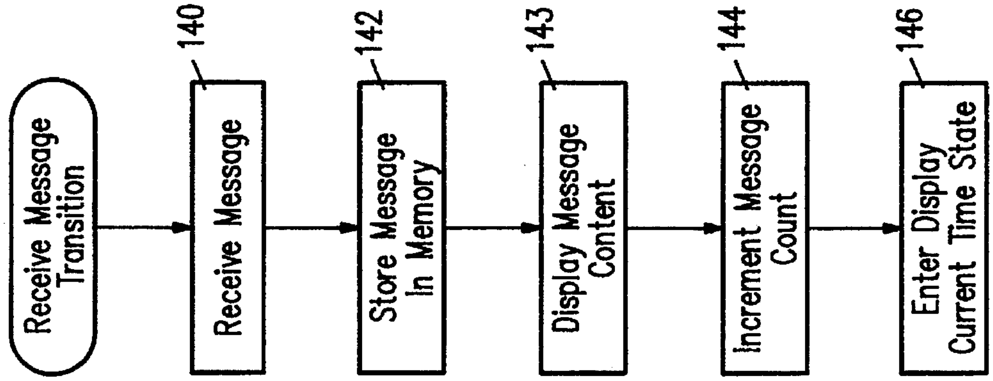
FIG. 9 shows a flow diagram of the "Receive Message" transition of FIG. 8.

Referring now to FIG. 9, which shows a block diagram of the "Receive Message" transition 122, the pager 34, 35 receives a paging message as step 140. The pager stores the message as step 142. The pager then displays the content of the message using the special hand 180 (FIG. 6) or first pointer 170 (FIG. 7), as step 143. The pager also increments the disk 181 (FIG. 6) or advances the second pointer 172 (FIG. 7) to show the number of messages stored in memory 36, as step 144. The pager then returns to the "Display Time" state 120 as step 146.

To display a "Code" message, the special hand 180 or first pointer 170 points to the corresponding mark or icon. Furthermore, the second hand 20 points to the number on the watch face 13 corresponding to the code number.

If the received message is a "Number" message, the special hand 180 or first pointer 170 points to the corresponding mark or icon. The number sequence is not displayed until the user presses the button 32, as described below.

Referring again to FIG. 8, when the user presses the button 32 the "Display Message Time" state 124 is entered.

In this state, the special hand 180 (FIG. 6) or first pointer (FIG. 7) continues to point to the content of the received message by pointing to the corresponding mark or icon. Additionally, the hour hand 16, the minute hand 18, and the second hand 20 display the time the pager 34, 35 received the message. When the user releases the button 32, the pager returns to the "Display Current Time" state 120.

If the message is a "Number" message, upon pressing the button 32, the pager 34, 35 moves the second hand 20 to the first number of the number sequence. Then, at regular intervals, such as every three seconds, the pager moves the second hand to the next number in the sequence. This continues until all numbers in the number sequence have been displayed. The pager then returns to the "Display Current Time" state 120.

The most-recently received message can be deleted as described above by depressing the button 32 for a predetermined extended time period. When a message is deleted, the number disk 181 (FIG. 6) or the second pointer 172 is moved to decrease by one the number indicated. The pager 34, 35 then enters the "Display Current Time" state 120.

Figure 10:
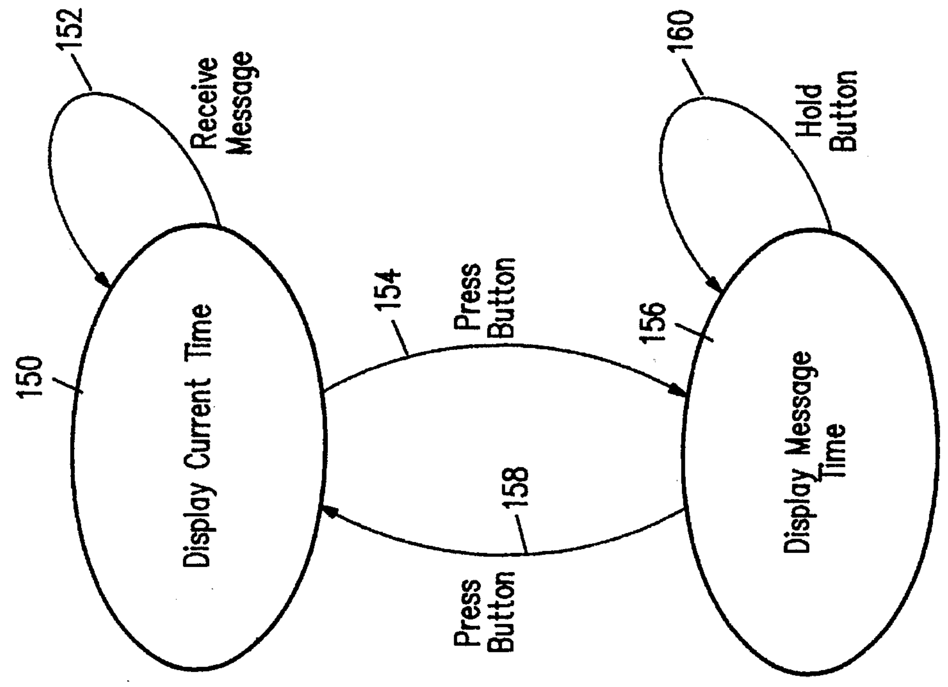
FIG. 10 shows a state diagram of another exemplary behavior of the wristwatch paging receivers of FIGS. 6 and 7.

Referring now to FIG. 10, other exemplary behavior of the pagers 34, 35 of FIGS. 6 and 7 according to the present invention is shown. In a "Display Current Time" state 150, the watch hands 16, 18, 20 of the pager display the current time. When the pager receives a message, the pager executes the "Receive Message" transition 152. This transition occurs as described in reference to FIG. 9 and results in the pager displaying the content of the received message.

When the user presses the button 32, the "Display Message Time" state 156 is entered. In this state, the special hand 180 (FIG. 6) or first pointer 170 (FIG. 7) continues to display the content of the message by pointing to the corresponding mark. The method for displaying "Number" messages is the same as described above with reference to the state diagram of FIG. 8. When the user presses the button 32 again, the pager 34, 35 returns to the "Display Current Time" state 150.

According to the behavior described in the state diagram of FIG. 10, the user may display other messages in memory 36 without first deleting all of the more recently received messages. While the pager 34, 35 is in the "Display Message Time" state 156, the user depresses the button 32 for a predetermined time period, such as two seconds. In response, the pager displays the content and time of reception of the previous message. The number disk 181 (FIG. 6) or second pointer 172 (FIG. 7) is decremented to show the number of the message being displayed.

When the user presses the button 32 for less than the predetermined time period, the pager 34, 35 returns to the "Display Current Time" state 150. If multiple messages were reviewed in the display message state 156, the second number disk 181 or second pointer 170 is reset to show the total number of messages stored in memory 36.

A second button (not shown) may be used in the "Display Message Time" state 156 to delete the currently displayed message. Such a capability is not necessary, however, as long as older messages are automatically deleted by the pager 34, 35. For example, the oldest message could be deleted to make room for a newly received message once a certain limit of messages has been received. Alternatively, a message could be deleted after it had been stored for a predetermined number of days.

Figure 11:
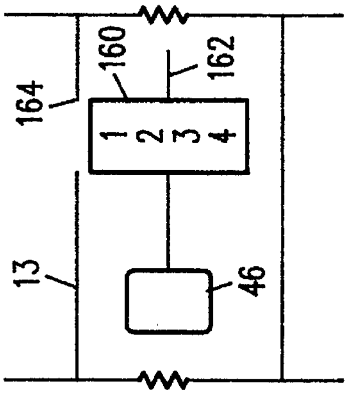
FIG. 11 shows a simplified cutaway diagram of another exemplary wristwatch paging receiver according to the present invention having a drum that is revealed through an aperture.

As shown in FIG. 11, a drum 160 having marks representing standard paging messages may be used instead of a rotating disk or other analog mechanism. Preferably, the axis of the drum is parallel to the watch face 13. An aperture 164 in the watch face enables the upper portion of the drum to be visible to the user. A motor 46 controlled by the CPU 42 rotates the drum such that a selected mark on the drum is visible through the aperture.

Figure 12:
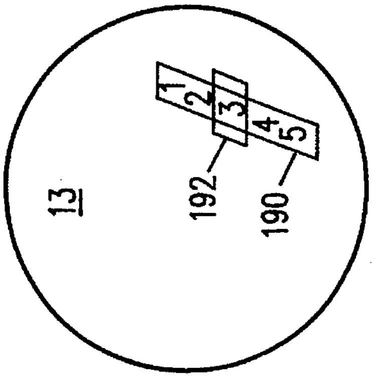
FIG. 12 shows a simplified cutaway diagram of another exemplary wristwatch paging receiver according to the present invention having a linearly-moving bar that is revealed through a window.

As shown in FIG. 12, a slide bar 190 having numbers, icons, or other marks thereon may also be used to display paging information. The slide bar is movable along its lengthwise dimension, enabling a selected mark to be viewed through an aperture 192 in the watch face 13.

A drum 160 or slide bar 190 may be used in the same manner as described above for disks 26, hands 180, or pointers 170, 172. That is, a drum or slide bar may be used to display a received message's content, time of reception, or both.

The present invention has be described in terms of using dedicated, special hands, pointers, disks, drums, and slide bars to display the content of received paging messages. This need not be the case. The hour hand 16, minute hand 18, and second hand 20 may be used instead of a special hand to point to marks representing standard paging messages or message counts.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

What is claimed is:

1. A method of displaying a paging message using an analog watch mechanism having a disk with marks thereon, the method comprising the steps of:

(a) receiving a paging message; and (b) moving the disk such that the mark is moved to a predetermined position, wherein the analog watch mechanism includes a watch face having an aperture therethrough and the disk is located behind the watch face, wherein the step of moving the disk includes moving the disk such that the mark is adjacent to the aperture.

2. A device for displaying paging messages, comprising:

paging receiver adapted to receive paging messages;

(b) a surface having a mark thereon representing a paging message, the mark being located on the surface such that the surface can be moved to move the surface to a predetermined position; and (c) control means, responsive to the paging receiver, for getting paging messages from the paging receiver, and in response to the getting of a message, for moving the surface such that the mark is in the predetermined position, wherein the device includes a watch face and wherein the surface is a disk arranged parallel to the watch face, and wherein the watch face has an aperture therethrough, wherein the disk is located behind the watch face, and wherein the predetermined position is adjacent to the aperture.

3. A device for displaying paging messages; comprising:

(a) a paging receiver adapted to receive paging messages;

(b) a surface having a mark thereon representing a paging message, the mark being located on the surface such that the surface can be moved to move the surface to a predetermined position; and (c) control means, responsive to the paging receiver, for getting paging messages from the paging receiver, and in response to the getting of a message, for moving the surface such that the mark is in the predetermined position, wherein the device includes a watch face and wherein the surface is a drum rotatable around its axis, where the drum arranged such that its axis of the drum is parallel to the watch face, and wherein the watch face has an aperture therethrough, wherein the drum is located behind the watch face, and wherein the predetermined position is adjacent to the aperture.

4. A device for displaying paging messages, comprising:

(a) a paging receiver adapted to receive paging messages;

(b) a surface having a mark thereon representing a paging message, the mark being located on the surface such that the surface can be moved to move the surface to a predetermined position; and (c) control means, responsive to the paging receiver, for getting paging messages from the paging receiver, and in response to the getting of a message, for moving the surface such that the mark is in the predetermined position;

wherein the device includes a watch face and wherein the surface is an elongate bar moveable along its longitudinal dimension, where the bar is arranged such that its longitudinal dimension is parallel to the watch face.

5. A device for displaying paging messages, comprising:

(a) a paging receiver adapted to receive paging messages;

(b) a surface having a mark thereon representing a paging message, the mark being located on the surface such that the surface can be moved to move the surface to a predetermined position; and (c) control means, responsive to the paging receiver, for getting paging messages from the paging receiver, and in response to the getting of a message, for moving the surface such that the mark is in the predetermined position, wherein the device includes a watch face and wherein the surface is an elongate bar moveable along its longitudinal dimension, where the bar is arranged such that its longitudinal dimension is parallel to the watch face, and wherein the watch face has an aperture therethrough, wherein the bar is located behind the watch face, and wherein the predetermined position is adjacent to the aperture.

* * * * *